United States Patent
Kim

(10) Patent No.: US 9,646,553 B2
(45) Date of Patent: May 9, 2017

(54) DISPLAY DEVICE

(71) Applicant: Samsung Display Co., Ltd., Yongin, Gyeonggi-Do (KR)

(72) Inventor: Swae-Hyun Kim, Asan (KR)

(73) Assignee: Samsung Display Co., Ltd. (KR)

( * ) Notice: Subject to any disclaimer, the term of this patent is extended or adjusted under 35 U.S.C. 154(b) by 137 days.

(21) Appl. No.: 14/334,441

(22) Filed: Jul. 17, 2014

(65) Prior Publication Data

US 2015/0187318 A1    Jul. 2, 2015

(30) Foreign Application Priority Data

Dec. 26, 2013 (KR) .................. 10-2013-0164540

(51) Int. Cl.
*G09G 3/36* (2006.01)
*G02F 1/1362* (2006.01)
*G02F 1/1337* (2006.01)
*G02F 1/1343* (2006.01)

(52) U.S. Cl.
CPC ....... *G09G 3/3648* (2013.01); *G02F 1/13624* (2013.01); *G09G 3/3614* (2013.01); *G02F 1/133707* (2013.01); *G02F 2001/133742* (2013.01); *G02F 2001/134345* (2013.01); *G09G 2300/0426* (2013.01); *G09G 2320/028* (2013.01); *G09G 2320/0233* (2013.01)

(58) Field of Classification Search
CPC .. G09G 3/3696; G09G 3/3648; G09G 3/3614; G09G 2300/0426; G09G 2320/028; G09G 2320/0233; G02F 1/13624; G02F 1/133707; G02F 2001/134345; G02F 2001/133742

See application file for complete search history.

(56) References Cited

U.S. PATENT DOCUMENTS

| | | | |
|---|---|---|---|
| 2002/0067322 A1* | 6/2002 | Yanagawa | G02F 1/134363 345/87 |
| 2007/0159587 A1 | 7/2007 | Kim et al. | |
| 2010/0118220 A1 | 5/2010 | Jang et al. | |
| 2010/0302471 A1* | 12/2010 | Kim | G02F 1/134363 349/37 |

(Continued)

FOREIGN PATENT DOCUMENTS

KR    10-2008-0062542    7/2008

*Primary Examiner* — Sahlu Okebato
(74) *Attorney, Agent, or Firm* — Innovation Counsel LLP

(57) ABSTRACT

A display device according to an exemplary embodiment of the inventive concept includes: a first insulation substrate; gate lines disposed on the first insulation substrate to transmit a gate signal; data lines crossing and insulated from the gate lines to transmit a data voltage; a first switching element and a second switching element which are connected to the corresponding gate and data lines; a dividing switching element connected to the corresponding gate lines, second switching element, and a reference voltage line; a first pixel electrode connected to the first switching element; and a second pixel electrode connected to the second switching element and the dividing switching element. A reference voltage applied to the dividing switching element from the reference voltage lines varies according to the polarities of the data voltage with respect to the common voltage.

18 Claims, 12 Drawing Sheets

(56) References Cited

U.S. PATENT DOCUMENTS

| | | | |
|---|---|---|---|
| 2010/0321364 A1* | 12/2010 | Chang | G09G 3/3614 345/211 |
| 2011/0310075 A1 | 12/2011 | Goh et al. | |
| 2012/0033001 A1 | 2/2012 | Kim et al. | |
| 2012/0236245 A1* | 9/2012 | Jung | G02F 1/1343 349/144 |
| 2012/0293736 A1 | 11/2012 | Jung et al. | |
| 2012/0313920 A1 | 12/2012 | Shimoshikiryoh | |
| 2012/0320019 A1 | 12/2012 | Jeong et al. | |
| 2013/0093658 A1 | 4/2013 | Park et al. | |
| 2013/0113787 A1 | 5/2013 | Shin et al. | |
| 2013/0182018 A1 | 7/2013 | Jeong et al. | |

\* cited by examiner

DISPLAY DEVICE

CROSS-REFERENCE TO RELATED APPLICATION

This application claims priority to and the benefit of Korean Patent Application No. 10-2013-0164540 filed in the Korean Intellectual Property Office on Dec. 26, 2013, the entire contents of which are incorporated herein by reference.

BACKGROUND (a) Field

The inventive concept relates to a display device.

(b) Description of the Related Art

A liquid crystal display device is currently one of the most widely used flat panel display devices, and includes two display panels on which electric field generating electrodes such as a pixel electrode and a common electrode are formed, and a liquid crystal layer interposed between the two display panels.

The liquid crystal display device displays an image by generating an electric field on a liquid crystal layer by applying a voltage to the field generating electrodes, determining alignment directions of liquid crystal molecules of the liquid crystal layer through the generated electric field, and controlling polarization of incident light.

Among the liquid crystal displays, a vertically aligned mode liquid crystal display, in which liquid crystal molecules are aligned so that long axes thereof are perpendicular to the upper and lower panels while no electric field is applied, has been in the limelight because its contrast ratio is high and a wide reference viewing angle is easily implemented.

However, such a liquid crystal display device has lower side visibility than front visibility, thus a method in which one pixel is divided into two subpixels to be applied with different voltages has been used in order to solve the problem.

In addition, a plurality of domains each having different alignment directions of the liquid crystal molecules can be formed in one pixel.

As described above, as a means of forming the plurality of domains, a method of forming cutouts such as minute slits in the field generating electrode or protrusions on the field generating electrode is used.

The method enables the plurality of domains to be created by aligning the liquid crystal molecules in a direction perpendicular to a fringe field that is generated between edges of the cutouts or protrusions and the field generating electrodes facing the edges thereof. The above information disclosed in this Background section is only for enhancement of understanding of the background of the invention and therefore it may contain information that does not form the prior art.

SUMMARY

The inventive concept has been made in an effort to provide a display device having overall uniform luminance by differentiating reference voltages depending on polarities of data voltages with respect to a common voltage so as to maintain fixed voltage differences between subpixels having a positive polarity and between subpixels having a negative polarity.

A display device according to an exemplary embodiment of the inventive concept includes a first insulation substrate, gate lines positioned on the first insulation substrate to transmit a gate signal, data lines crossing and insulated from the gate lines to transmit a data voltage, a first switching elements and a second switching elements each connected to a corresponding gate line of the gate lines and a corresponding data line of the data lines, a dividing switching elements each connected to a corresponding gate line of the gate lines, a corresponding second switching element of the second switching elements, and a reference voltage lines, pixel electrodes each including a first subpixel electrode and a second subpixel electrode, the first subpixel electrode being connected to a corresponding first switching element of the first switching elements, and the second pixel electrode being connected to a corresponding second switching element of the second switching elements and a corresponding dividing switching element of the dividing switching elements.

A reference voltage applied to the dividing switching element from the reference voltage lines may vary according to polarities of the data voltage with respect to the common voltage.

A plurality of pixel areas positioned at one side of the data lines may be connected to the data lines.

The data lines may be alternately connected to the pixel areas disposed at their left and right sides along a row direction.

The display device may further include a reference voltage signal wire including a first reference voltage signal wire and a second reference voltage signal wire extending in a row direction and alternatingly connected to the reference voltage lines.

A first reference voltage provided by the first reference voltage signal wire and a second reference voltage provided by the second reference voltage signal wire may have different polarities with respect to the common voltage in the same frame.

The first and second reference voltages may have predetermined magnitudes, and their polarities with respect to the common voltage may be inverted in each frame.

The first and second reference voltages may have a voltage between minimum and maximum values for the data voltage.

The first and second reference voltages may have a voltage between minimum and maximum voltages of the data voltage.

The data voltage and the reference voltage may have the same polarity with respect to the common voltage.

The reference voltage line may include two vertical portions and a connection portion connecting the two vertical portions.

The two vertical portions may be respectively positioned at centers of the first and second subpixel electrodes.

The data lines may be positioned on the same layer as the reference voltage line.

The display device may further include a color filter disposed on the first passivation layer. The color filter is made of a low-dielectric material.

The voltage applied to the second subpixel electrode may be increased if the data voltage applied to the second subpixel electrode has the same polarity as the reference voltage with respect to the common voltage.

A driving method of a display device according to an exemplary embodiment of the inventive concept, the display device including a plurality of pixels, each pixels including a first switching element, a second switching element, a dividing switching element connected between the second switching element and a reference voltage line, a first liquid crystal capacitor connected to the first switching element, and a second liquid crystal capacitor includes applying data voltages to the plurality of pixels, applying a first reference voltage to pixels applied with the data voltage having a first polarity, and applying a second reference voltage to pixels applied with the data voltage having a second polarity opposite to the first polarity with respect to the common voltage.

The reference voltage line may extend in a row direction to include a first reference voltage line and a second reference voltage line which are alternately connected to the plurality of pixel areas, and the first reference voltage transmitted through the first reference voltage line and the second reference voltage transmitted through the second reference voltage line may have opposite polarities with respect to the common voltage in the same frame.

The first and second reference voltages may have predetermined magnitudes and their polarities with respect to the common voltage are inverted in each frame.

The first and second reference voltages may have a voltage between minimum and maximum values for the data voltage.

The first and second reference voltages may have a voltage between minimum and maximum voltages of the data voltage.

The data voltage applied to the second subpixel electrode may be increased if the data voltage applied to the second subpixel electrode has the same polarity as the reference voltage with respect to the common voltage.

As described above, the display device according to the exemplary embodiment of the inventive concept may differentiate the reference voltages depending on the polarities of the data voltages with respect to the common voltage so as to maintain fixed voltage differences between the subpixels having the positive polarity and between the subpixels having the negative polarity, thereby providing overall uniform luminance.

DETAILED DESCRIPTION OF THE EMBODIMENTS

Figure 1:
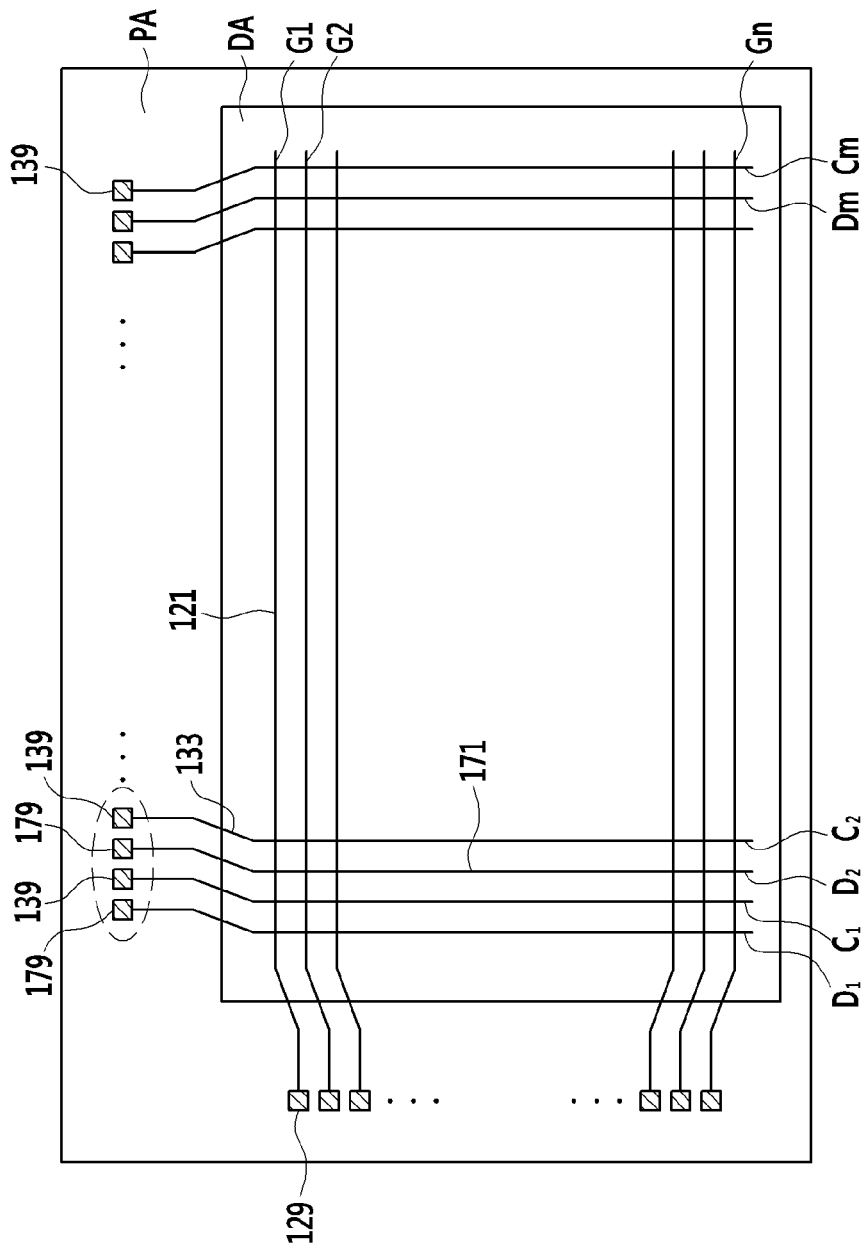
FIG. 1 is a schematic top plan view of a display device according to an exemplary embodiment of the inventive concept.

The inventive concept will be described more fully hereinafter with reference to the accompanying drawings, in which exemplary embodiments of the invention are shown. As those skilled in the art would realize, the described embodiments may be modified in various different ways, all without departing from the spirit or scope of the inventive concept.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

The term "a pixel area" used in the present invention means a unit pixel defined by one pixel electrode including a first subpixel electrode and a second pixel electrode.

In addition, the term "polarity" used in the inventive concept represents a relative high state or low state with respect to a predetermined voltage, and positive polarity means having a higher voltage than a common voltage while negative polarity means having a lower voltage than the common voltage.

A display device according to an exemplary embodiment will be described first with reference to FIGS. 1 to 4B.

Figure 2:
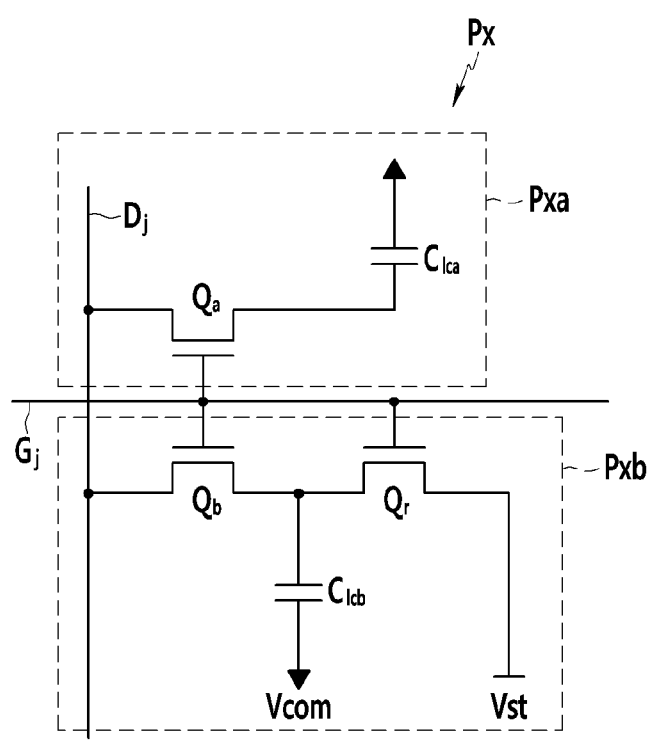
FIG. 2 is a circuit diagram of the display device according to the exemplary embodiment of the inventive concept.
Figure 3:
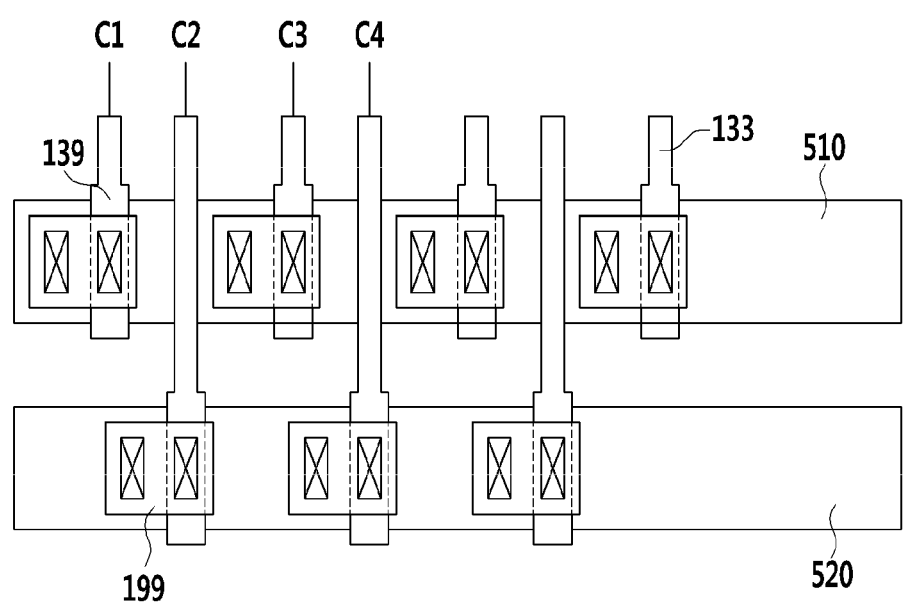
FIG. 3 is a partial top plan view of a peripheral area according to the exemplary embodiment of the inventive concept.
Figure 4A:
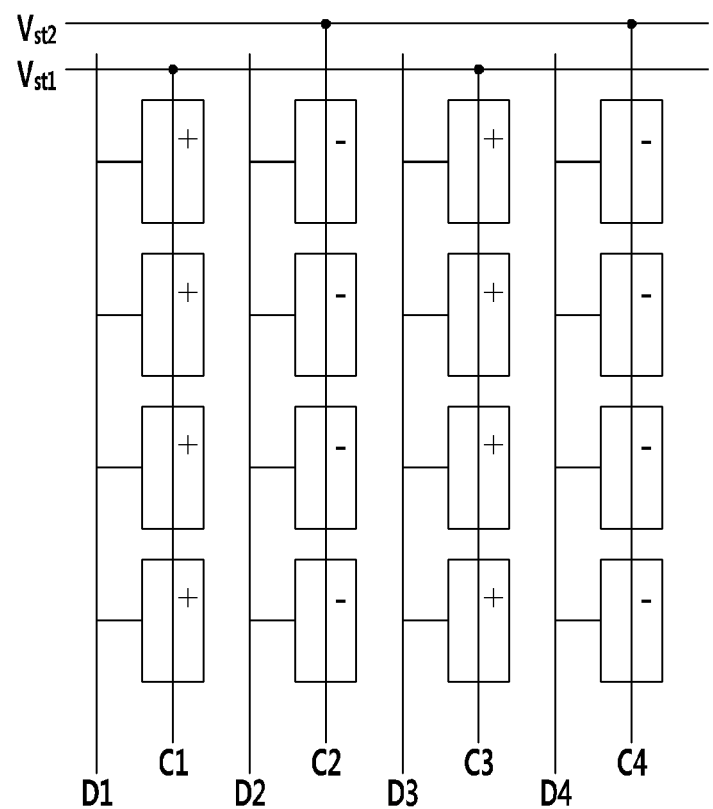
FIG. 4A is a schematic view of signal wires and pixel arrangement according to the exemplary embodiment of the inventive concept.
Figure 4B:
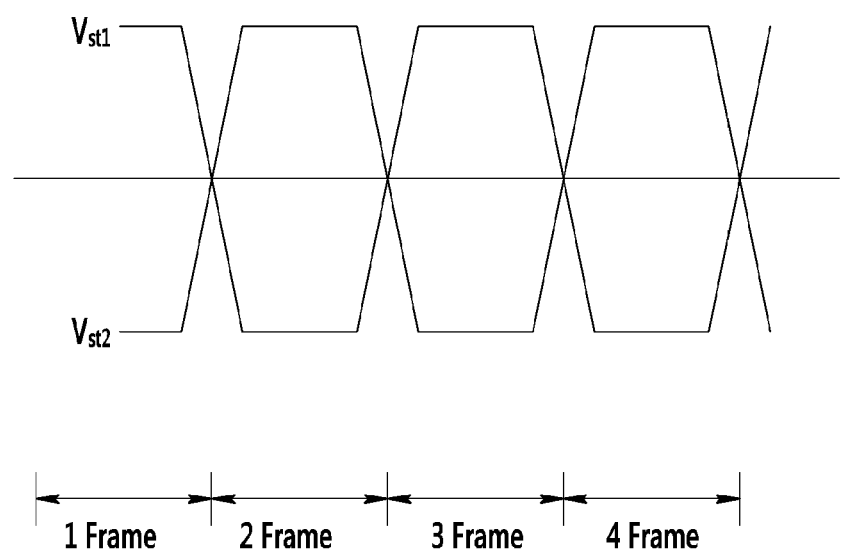
FIG. 4B is a waveform diagram of FIG. 4A.

FIG. 1 is a schematic top plan view of a display device according to an exemplary embodiment of the inventive concept, FIG. 2 is a circuit diagram of the display device according to the exemplary embodiment of the inventive concept, FIG. 3 is a partial top plan view of a peripheral area according to the exemplary embodiment of the inventive concept, FIG. 4A is a schematic view of signal wires and pixel arrangement according to the exemplary embodiment of the inventive concept, and FIG. 4B is a waveform diagram of FIG. 4A.

The display device to be described in the present specification includes a display area DA for displaying an image by a voltage application, and a peripheral area PA positioned in a periphery of the display area to be provided with pad portions 129, 139, and 179 formed by elongated signal lines.

Referring to FIG. 1, signal lines disposed in the display area DA include a plurality of gate lines G1 to Gn for transmitting a gate signal (referred to as a scanning signal), a plurality of data lines D1 to Dm for transmitting a data voltage, and a plurality of reference voltage lines C1 to Cm for transmitting a reference voltage.

In addition, the signal lines include a wide area for connecting a contact member so as to receive signals from a driving unit (not shown), that is, pad portions 129, 139, and 179.

Referring to FIG. 2, a pixel PX included in the display device according to the exemplary embodiment of the inventive concept includes a first subpixel PXa and a second subpixel PXb.

The first subpixel PXa includes a first switching element Qa connected to at least one data line Dj and at least one gate line Gi, and a first liquid crystal capacitor Clca connected to the first switching element Qa. The second subpixel includes a second switching element Qb connected to at least one data line Dj and at least one gate line Gi, a dividing switching element Qr, and a second liquid crystal capacitor Clcb connected therebetween.

The first switching element Qa is a three terminal-element such as a thin film transistor, which includes a control terminal connected to the gate line Gi, an input terminal connected to the data line Dj, and an output terminal connected to the first liquid crystal capacitor Clca.

According to a driving method of the inventive concept, the first switching element Qa may be controlled by the gate signal provided by the gate line Gi and deliver the data voltage provided by the data line Dj to the first liquid crystal capacitor Clca.

The second switching element Qb is the three-terminal element such as the thin film transistor, which includes a control terminal connected to the gate line Gi, an input terminal connected to the data line Dj, and an output terminal connected to the second liquid crystal capacitor Clcb and an input terminal of the dividing switching element Qr.

According to the driving method of the inventive concept, the second switching element Qb may be controlled by the gate signal provided by the gate line Gi and deliver the data voltage provided by the data line Dj to the second liquid crystal capacitor Clcb.

The dividing switching element Qr is the three-terminal element such as the thin film transistor, which includes a control terminal connected to the gate line Gi, an input terminal connected to the output terminal of the second switching element Qb, and an output terminal connected to a reference voltage line Vst.

The dividing switching element Qr is controlled by the gate signal provided by the gate line Gi. The data voltage provided by the data line Dj may be divided by the second switching element Qb and the dividing switching element Qr, and stored to the second liquid crystal capacitor Clcb.

The first and second subpixels PXa and PXb may display images according to one input image signal IDAT. The first and second subpixels PXa and PXb may use the same gamma curve but may use different gamma curves respectively. Herein, the gamma curve is a curve that represents luminance or transmittance according to a gray of the input image signal IDAT.

According to the exemplary embodiment of the inventive concept, the gamma curve applied to the second subpixel PXb may be adjusted by controlling a resistance ratio of the second switching element Qb to the dividing switching element Qr, the reference voltage, and the like.

As described above, a charging voltage of the second liquid crystal capacitor Clcb may be adjusted by controlling the dividing switching element Qr, the reference voltage, and the like, to differentiate the luminance of the two subpixels PXa and PXb, and the charging voltages of the first liquid crystal capacitor Clca and the second liquid crystal capacitor Clcb may be appropriately adjusted to make an image viewed from the side virtually identical to an image viewed from the front, thereby improving side visibility.

Further, the amount and direction of leakage current of the dividing switching element Qr may be adjusted by controlling a first reference voltage Vst1 or a second reference voltage Vst2 that is connected to a plurality of dividing switching elements Qr.

This is because the luminance of the second subpixel PXb can be adjusted by the charged voltage of the second liquid crystal capacitor Clcb that varies depending on its polarity.

For example, even in one frame, the applied reference voltage may vary between a first reference voltage and a second reference voltage according to the polarity of the data voltage so as to obtain overall uniform luminance across the display device.

Areas of the first and second subpixels PXa and PXb may be the same as or different from each other.

In the display device according to the exemplary embodiment of the inventive concept, the reference voltage Vst may be controlled in various ways according to the polarity of the data voltage.

A driving method of a display device according to an exemplary embodiment of the inventive concept will now be described with reference to FIGS. 3 and 4.

Referring to FIG. 3, a plurality of reference voltage pad portions 139 are formed at the one end of the reference voltage lines in the peripheral area PA.

The reference voltage pad portions 139 are connected to respective reference voltage signal wires 510 and 520. The reference voltage pad portions 139 may be electrically connected to the respective reference voltage signal wires including a first reference voltage signal wire 510 and a second reference voltage signal wire 520 through contact holes as an example.

Connection methods are not limited thereto, but connections may be made through a bridge 199 for connecting the contacts holes respectively positioned in the reference voltage pad portions 139 and the reference voltage signal wires 510 and 520.

Meanwhile, a reference voltage applying unit or a signal controller may be disposed at one side of the reference voltage signal wires 510 and 520 such that the reference voltage signal wires 510 and 520 can be respectively applied with different voltages according to control of the signal controller.

In detail, odd-numbered reference voltage pad portions 139, $C_{2n-1}$, of a reference voltage line 133 such as $C_1$, $C_3$, . . . , etc. may be connected to the first reference voltage signal wire 510, while even-numbered reference voltage pad portions 139, $C_{2n}$, of the reference voltage line 133 such as $C_2$, $C_4$, . . . , etc. may be connected to the second reference voltage signal wire 520.

In this case, n is a natural number, and as an example, odd-numbered reference voltage lines 133 may be connected to the first reference voltage signal wire 510 while even-numbered reference voltage lines 133 may be connected to the second reference voltage signal wire 520.

The opposite case is also possible.

That is, a plurality of reference voltage lines 133 may be alternately connected to the first and second reference voltage signal lines 510 and 520.

In the same frame, the first and second reference voltage signal wires 510 and 520 may be applied with voltages having different polarities with respect to a common voltage, and the reference voltage having the same polarity as the data voltage applied to a pixel area may be applied.

This will be described in more detail with reference to FIGS. 4A and 4B.

FIG. 4A shows an exemplary embodiment in which the data voltage having the same polarity is applied to each column of the pixel area, which is referred to as column inversion.

As an example, a plurality of pixel areas connected to an (2n−1)-th data line $D_1$, $D_3$, . . . , etc. have a positive (+)

polarity, while a plurality of pixel areas connected to an (2n)-th data line $D_2$, $D_4$, ..., etc. have a negative (−) polarity.

Such positive and negative polarities will be alternately repeated along the gate line in a row direction.

The reference voltage line $C_1$ extends in a column direction and overlaps the plurality of pixel areas connected to the data line $D_1$. The reference voltage line $C_1$ is connected to the first reference voltage signal wire that applies the first reference voltage Vst1.

The reference voltage line $C_2$ next to the reference voltage line $C_1$ is connected to the second reference voltage signal wire that applies the second reference voltage Vst2. The reference voltage line $C_3$ is connected to the first reference voltage signal wire.

That is, the plurality of reference voltage lines arranged in the row direction are alternately connected to the first and second reference voltage signal wires.

In this case, the reference voltage lines connected to the first reference voltage signal wire is referred to as a first reference voltage lines, and the first reference voltage lines are applied with the first reference voltage.

The reference voltage lines connected to the second reference voltage signal wire are referred to as a second reference voltage lines, and the second reference voltage lines are applied with the second reference voltage.

Referring to FIG. 4B, as an example, the first reference voltage wire applies the first reference voltage Vst1 having the same polarity as the date voltage applied to the corresponding pixel areas.

During the first frame, the first reference voltage Vst1 may have the positive polarity with respect to the predetermined voltage.

This is because the pixel areas connected to the first reference voltage line have the positive polarity.

On the contrary, the second reference voltage signal wire may apply the second reference voltage Vst2 having the negative polarity with respect to the predetermined voltage.

This is because the pixel areas connected to the second reference voltage line also have the negative polarity.

In summary, the inventive concept may apply respective different reference voltages to the pixel areas according to the polarity of the applied data voltage, and the reference voltages may have the same polarity as the data voltage.

During the second frame, due to column inversion, the plurality of pixel areas disposed in the (2n−1)-th column have the negative (−) polarity, while the plurality of pixel areas disposed in the (2n)-th column have the positive (+) polarity.

Such polarity arrangements are continuously repeated along the direction of the gate line.

In this case, the first reference voltage signal wire applies the first reference voltage Vst1 having the negative polarity with respect to the predetermined voltage, while the second reference voltage signal wire applies the second reference voltage Vst2 having the positive polarity with respect to the predetermined voltage.

Accordingly, the reference voltages applied to the pixel areas are different even in the same frame, respectively, and the reference voltage may have the same polarity as the data voltage.

The reference voltage variations described above are continuously repeated in each frame.

The procedures described above are repeated in a unit of one horizontal period (referred to as 1H, and being the same as one period of a horizontal synchronization signal Hsync and a data enable signal DE) such that the gate-on voltage Von is sequentially applied to all the gate lines G1 to Gn and the data voltage is applied to all pixels PX, thereby displaying the image for one frame.

As described above, when one frame ends, the next frame starts, and a state of an inversion signal included in a data control signal CONT2 can be controlled such that the polarity of the data signal applied to each pixel PX may be opposite to the polarity in the previous frame (referred to as frame inversion).

Even in one frame, according to a characteristic of the inversion signal, the polarity of the data voltage transmitted through the data lines D1 to Dm may be periodically changed, or the polarities of the data voltages applied to the data lines D1 to Dm in one pixel row may be different from each other.

In summary, in the same frame, the odd-numbered first reference voltage lines may be applied with the predetermined first reference voltage, while the even-numbered second reference voltage lines may be applied with the predetermined second reference voltage.

The first and second reference voltages may have the opposite polarity with respect to the common voltage.

Such reference voltage variations are periodically repeated in each frame.

Meanwhile, the first and second reference voltages Vst1 and Vst2 may have a voltage between a maximum voltage Vd_max and a minimum voltage Vd_min of the data voltage, and a swing cycle of the first and second reference voltages Vst1 and Vst2 may be one frame.

According to the driving method described above, the voltage applied to the second subpixel electrode by the data and reference voltages may be increased in magnitude irrespective of the polarities, and as a result, luminance differences may be reduced even if the polarities are varied.

A structural aspect of the display device according to the exemplary embodiment of the inventive concept will be described with reference to FIGS. 5 to 8.

Figure 5:
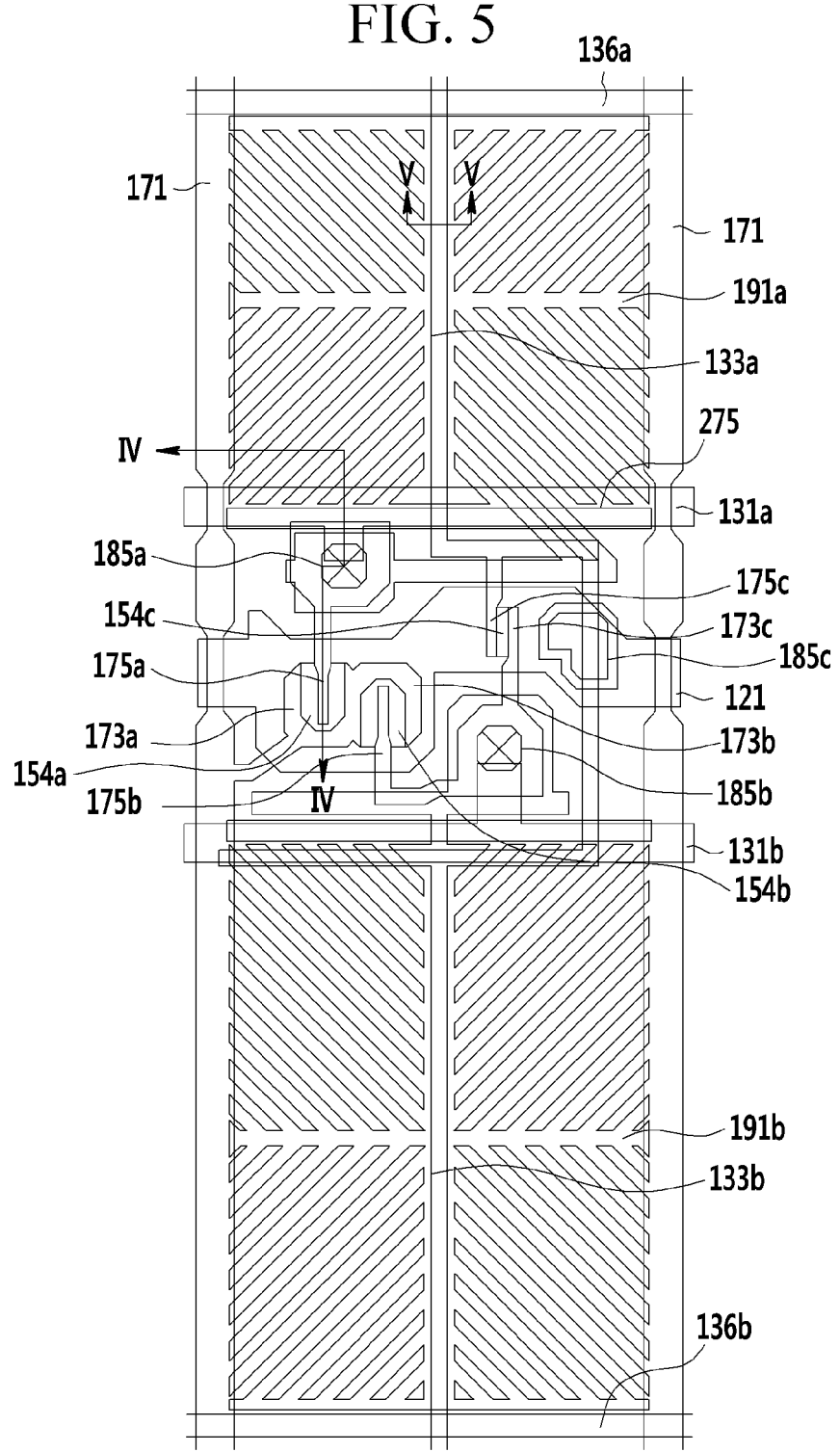
FIG. 5 is a top plan view of a pixel of the display device according to the exemplary embodiment of the inventive concept.
Figure 6:
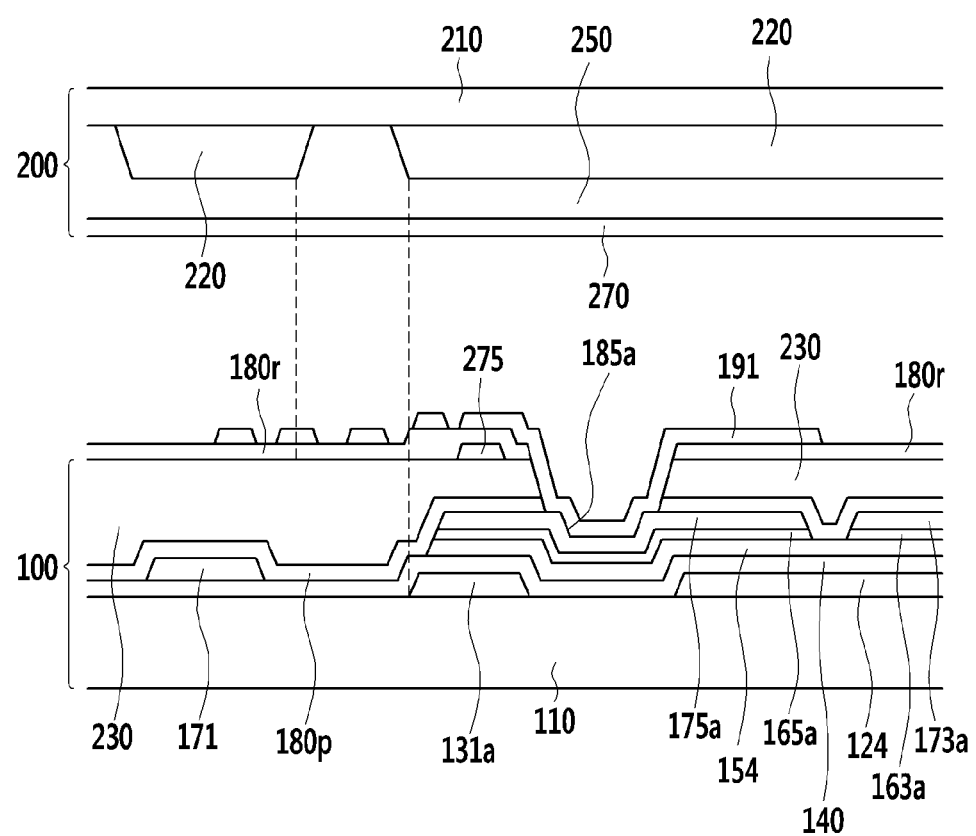
FIG. 6 is a cross-sectional view of FIG. 5 taken along the line IV-IV.
Figure 7:
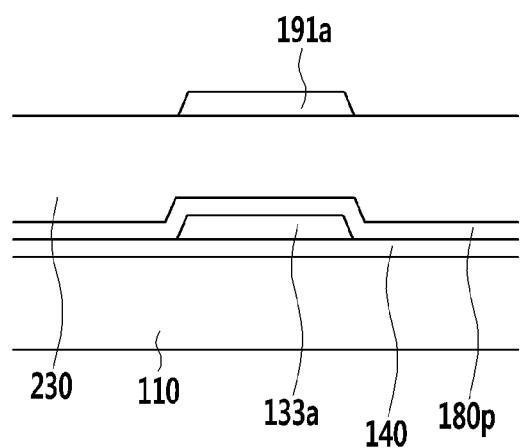
FIG. 7 is a cross-sectional view of FIG. 5 taken along the line V-V.
Figure 8:
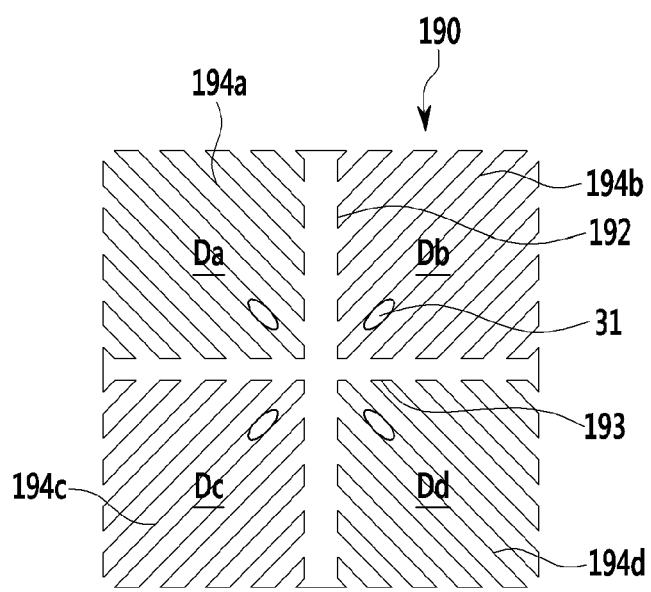
FIG. 8 is a top plan view of a basic electrode according to the exemplary embodiment of the inventive concept.

FIG. 5 is a top plan view of a pixel of the display device according to the exemplary embodiment of the inventive concept, FIG. 6 is a cross-sectional view of FIG. 5 taken along the line IV-IV, FIG. 7 is a cross-sectional view of FIG. 5 taken along the line V-V, and FIG. 8 is a top plan view of a basic electrode according to the exemplary embodiment of the inventive concept.

A lower display panel 100 will be described first.

A gate conductor is formed on a first insulation substrate 110 made of transparent glass or plastic.

The gate conductor includes gate lines 121 extending in the horizontal direction in the pixel area, first storage electrode lines 131a and 131b disposed in the horizontal direction above or below the gate line, and second storage electrode lines 136a and 136b extending in the horizontal direction above or below edges of the pixel area.

In addition, the reference voltage signal wires 510 and 520 illustrated in FIG. 4 may be integrally formed with the gate conductor to be disposed at the peripheral area on the peripheral area PA.

A gate insulation layer 140 is disposed on the gate lines 121 and the storage electrode lines 131a and 131b.

A first semiconductor 154a, a second semiconductor 154b, and a third semiconductor 154c are disposed on the gate insulation layer 140.

A plurality of ohmic contacts, for example, 163a and 165a in FIG. 6, maybe disposed on the semiconductors 154a, 154b, and 154c.

However, when the semiconductors 154a, 154b, and 154c are oxide semiconductors, the plurality of ohmic contacts may be omitted.

A plurality of data lines 171 including first and second source electrodes 173a and 173b, a first drain electrode 175a, a second drain electrode 175b, and a data conductor including a third source electrode 173c and a third drain electrode 175c are disposed on the gate insulation layer 140.

In this case, the data conductor may be simultaneously formed with the semiconductors and the ohmic contacts that are disposed thereunder by using one mask.

The data lines 171 include a wide end portion 179 for connection with other layers or external driving circuits, for example, data driver ICs.

The first source electrode 173a and the first drain electrode 175a form a first switching element Qa (or a first thin film transistor) together with the first semiconductor, and channels thereof are formed between the first source electrode 173a and the first drain electrode 175a.

Similarly, the second source electrode 173b, and the second drain electrode 175b form a second switching element Qb (or a second thin film transistor) together with the second semiconductor 154b, and channels thereof are formed in the semiconductor 154b between the second source electrode 173b and second drain electrode 175b. The third source electrode 173c, and third drain electrode 175c form a third switching element Qc (a dividing switching element or a third thin film transistor), and channels thereof are formed in the semiconductor 154c between the third source electrode 173c and third drain electrode 175c.

In this case, the second drain electrode 175b is connected to the third source electrode 173c.

A first passivation layer 180p is formed on the data conductors 171, 173c, 175a, 175b, and 175c and exposed portions of the semiconductors 154a, 154b, and 154c.

The first passivation layer 180p may include an inorganic insulating layer such as a silicon nitride ($SiN_x$), a silicon oxide ($SiO_x$), or the like.

The first passivation layer 180p may prevent a pigment of the color filter 230 from permeating into the exposed portions of the semiconductor 154a, 154b, and 154c.

A color filter 230 is formed on the first passivation layer 180p.

The color filter 230 extends in the vertical direction along the two adjacent data lines.

The color filter 230 according to the exemplary embodiment of the inventive concept may be made of a low-dielectric material, and coupling between a vertical portion 133a of the reference voltage line 133 and the pixel electrode 191a spaced apart from each other at a predetermined interval can be prevented, as shown in FIG. 7.

A second passivation layer 180r may be disposed on the color filter 230.

A first contact hole 185a and a second contact hole 185b exposing the first and second drain electrode 175a and 175b are formed on the first and second passivation layers 180p and 180r, respectively.

A plurality of pixel electrodes 191 are disposed on the second passivation layer 180r.

The pixel electrodes 191 are separated from each other while interposing the gate lines 121, and include first and second subpixel electrodes 191a and 191b neighboring each other in the column direction with a gate line 121 interposed therebetween.

The pixel electrode 191 may be made of a transparent material such as indium tin oxide (ITO) and indium zinc oxide (IZO).

The pixel electrode 191 may also be made of a reflective metal such as aluminum, silver, chromium, or an alloy thereof.

The first and second subpixel electrodes 191a and 191b roughly have a quadrangular shape, and include a cross-shaped stem portion consisting of a horizontal stem portion and a vertical stem portion perpendicular to the horizontal stem portion, and a fine branch portion extending from the horizontal stem portion and the vertical stem portion.

The shape of the pixel electrode will be described later in detail.

Vertical portions 133a and 133b of the reference voltage line are disposed to overlap the vertical portions of the first and second subpixel electrodes 191a and 191b.

In this case, the width of the vertical portions 133a and 133b may be smaller than that of the vertical portions of the subpixel electrodes 191a and 191b.

The first and second subpixel electrodes 191a and 191b are physically and electrically connected to the first and second drain electrodes 175a and 175b through the first and second contact holes 185a and 185b, respectively, and are applied with the data voltage from the first and second drain electrodes 175a and 175b.

In this case, the voltage applied to the second drain electrode 175b is partially divided by the third source electrode 173c such that the voltage applied to the first subpixel electrode 191a is greater than that applied to the second subpixel electrode 191b.

The first and second subpixel electrodes 191a and 191b applied with the data voltage generate the electric field along with a common electrode 270 of an upper display panel 200, thereby determining the directions of liquid crystal molecules of a liquid crystal layer disposed between the two electrodes 191 and 270.

The luminance of the light passing through the liquid crystal layer may be dependent upon the direction of the liquid crystal molecules described above.

The upper display panel 200 will now be described.

A light blocking member 220 is formed on a second insulation substrate 210 made of transparent glass or plastic.

The light blocking member 220 is also referred to as a black matrix, and serves to prevent light leakage.

In the present specification, the light blocking member 220 is disposed in the upper display panel 200, but it is not limited thereto, and it may be disposed in the lower display panel 100.

The light blocking member 220 is formed to entirely cover the first and second switching elements Qa and Qb, the dividing switching element Qr, and the region in which the first to third contact holes 185a, 185b, and 185c are disposed, and extends in the same direction as the gate lines 121 so as to partially overlap the data lines 171.

The light blocking member 220 is disposed to at least partially overlap the two data lines 171, and prevents the light leakage generated proximate to the data and gate lines 121 and 171 and in the region where the plurality of switching elements Qa, Qb, and Qc are disposed.

An overcoat 250 is disposed on the light blocking member 220.

The overcoat 250 may be made of an (organic) insulating material, and provides a smooth surface.

The overcoat 250 may be omitted.

The common electrode 270 is disposed on the overcoat 250.

An upper alignment layer (not shown) may be disposed on the common electrode 270, and may be a vertical alignment layer.

The liquid crystal layer has negative dielectric anisotropy, and the liquid crystal molecules of the liquid crystal layer are aligned to be perpendicular to the surfaces of the two display panels 100 and 200 with respect to their long axes when no electric field is applied.

A basic electrode of a display device according to an exemplary embodiment of the inventive concept will now be described with reference to FIG. 8.

FIG. 8 is a top plan view of a basic area for a field generating electrode of the display device according to the exemplary embodiment of the inventive concept.

Referring to FIG. 8, the basic electrode 190 roughly has a quadrangular shape, and includes a cross-shaped stem portion consisting of a horizontal stem portion 193 and a vertical stem portion 192 perpendicular thereto.

In addition, the basic electrode 190 is divided into a first subregion Da, a second subregion Db, a third subregion Dc, and a fourth subregion Dd defined by the horizontal and vertical stem portions 193 and 192, and the subregions Da to Dd include a plurality of first to fourth fine branch portions 194a, 194b, 194c, and 194d, respectively.

The first fine branch portion 194a obliquely extends in an upper left direction from the horizontal stem portion 193 or vertical stem portion 192, while the second fine branch portion 194b obliquely extends in an upper right direction from the horizontal stem portion 193 or vertical stem portion 192.

In addition, the third fine branch portion 194c obliquely extends in a lower left direction from the horizontal stem portion 193 or vertical stem portion 192, while the fourth fine branch portion 194b obliquely extends in a lower right direction from the horizontal stem portion 193 or vertical stem portion 192.

The first to fourth fine branch portions 194a, 194b, 194c, and 194d form an angle of about 45 or 135 degrees with respect to the gate line 121 or the horizontal stem portion 193.

Further, the fine branch portions 194a, 194b, 194c, and 194d of the two adjacent subregions Da, Db, Dc, and Db may be perpendicular to each other.

When the electric field is applied to the liquid crystal layer, the first to fourth branch portions 194a, 194b, 194c, and 194d generate a fringe field.

By the fringe field, the liquid crystal molecules 31 are tilted in a direction parallel to a length direction of the fine branch portions 194a, 194b, 194c, and 194d.

The basic electrode 190 includes the four different subregions Da to Dd in which the length directions of the fine branch portions 194a, 194b, 194c, and 194d are different from each other such that the liquid crystal molecules 31 are tilted in four directions so as to form four domains having different alignment directions, respectively.

As described above, a reference viewing angle becomes wider by having various tilting directions of the liquid crystal molecules.

Figure 9A:
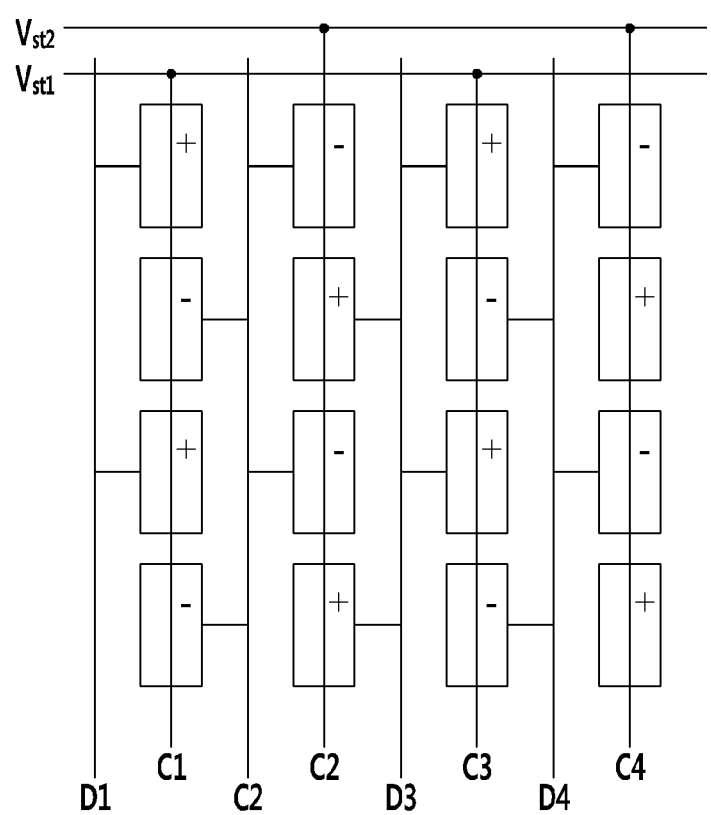
FIG. 9A is a schematic view of signal wires and pixel arrangement according to another exemplary embodiment of the inventive concept.
Figure 9B:
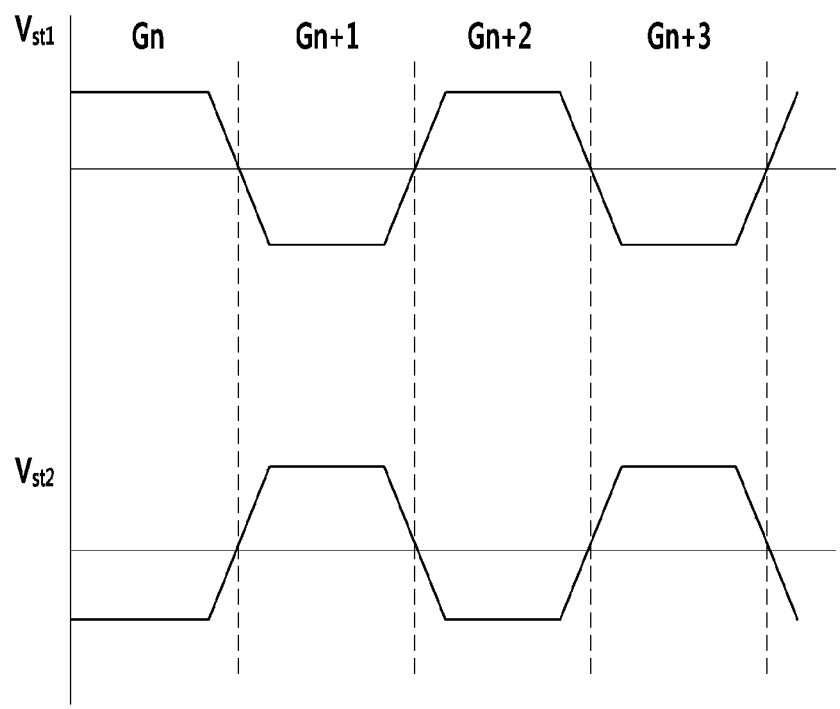
FIG. 9B is a signal waveform diagram of FIG. 9A.

FIGS. 9A and 9B are layout views of signal wires and pixels according to another exemplary embodiment of the inventive concept.

FIG. 9A shows a case, referred to as dot conversion, in which the polarity of every other pixel alternates.

Particularly, the data lines according to the exemplary embodiment of the inventive concept are alternately connected to the plurality of pixel areas arranged on the left and right of the data lines.

When viewed along an extending direction of the data line, the data line is connected to a pixel area arranged on its right side in one row, and is connected to a pixel area arranged on its left side in the next row.

Again in the next row, the data line is connected to a pixel area arranged on its right side, and such connection configuration shown in FIG. 9A is repeated.

As shown in FIG. 9A, a plurality of pixel areas connected to odd numbered data lines $D_1$, $D_3$, ..., etc. have the positive (+) polarity, while a plurality of pixel areas connected to even numbered data lines $D_2$, $D_4$, ..., etc. have the negative (−) polarity.

Such positive and negative polarities will be repeated along the gate line in the row direction.

However, as opposed to the exemplary embodiment of FIG. 4A, the data lines are alternately connected to the pixel areas arranged on their right and left sides such that the positive and negative polarities are alternately shown in one column.

A reference voltage line $C_1$ extends in the column direction to overlap a plurality of pixel areas disposed at the first column such that it is connected to the first reference voltage signal wire which applies the first reference voltage Vst1.

A next reference voltage line $C_2$ traverses a plurality of pixel areas to be connected to the second reference voltage signal wire which applies the second reference voltage Vst2.

A third reference voltage line $C_3$ is connected again to the first reference voltage signal wire.

That is, the plurality of reference voltage lines arranged in the row direction overlap the plurality of pixel areas arranged in a column direction. The plurality of reference voltage lines are alternatingly connected to the first and second reference voltage signal wires.

In this case, the reference voltage lines connected to the first reference voltage signal wire are called as a first reference voltage lines, and are applied with the first reference voltage.

The reference voltage lines connected to the second reference voltage signal wire are called as a second reference voltage lines, and are applied with the second reference voltage.

Referring to FIG. 9B, during the first frame, the first reference voltage signal wire applies the first reference voltage Vst1 having the positive polarity with respect to the predetermined voltage as an example.

This is because the predetermined pixel areas connected to the first reference voltage wire have the positive polarity.

Meanwhile, as shown in FIG. 9A, the pixel area positioned next to the pixel area having the positive polarity has the negative polarity.

Accordingly, the first reference voltage is inverted to have the negative polarity with respect to the predetermined voltage, and the inverted signal is applied according to a gate-on signal applied to each row.

In the n-th column, if the pixel area positioned in the n-th row has the positive polarity, the first reference voltage having the positive polarity is applied, and if the pixel area positioned in the (n+1)-th row has the negative polarity, the first reference voltage having the negative polarity is applied according to the gate-on signal applied to the (n+1)-th row.

Such conversions are repeatedly executed.

However, as shown in FIG. 9A, the pixel area in the (n+1)-th row has the negative polarity, while the pixel area in the next row has the positive polarity.

Accordingly, the second reference voltage is inverted to have the positive polarity with respect to the predetermined voltage, and such an inversion signal is applied to the pixels having positive polarity according to the gate-on signal applied to each row.

In the n-th column, if the pixel area positioned in the n-th row has the positive polarity, the second reference voltage having the positive polarity is applied, and if the pixel area positioned in the (n+1)-th row has the negative polarity, the second reference voltage having the negative polarity is applied according to the gate-on signal applied to the (n+1)-th row.

Such conversions are repeatedly executed.

In summary, according to the inventive concept, different reference voltages may be applied to the pixel areas depending on the polarity of the data voltage, and the reference voltage may have the same polarity as the data voltage.

Particularly, according to another exemplary embodiment of the present invention, even if positioned in the same row, the pixel areas may have different polarities, and the reference voltage having the same polarity as the data voltages applied to the corresponding pixels.

The voltage application principles described above is applicable to one frame.

That is, the procedures described above will be repeated in a unit of one horizontal period (referred to as 1H, and being the same as one period of a horizontal synchronization signal Hsync and a data enable signal DE) such that the data voltage is applied to all pixels PX by sequentially applying the gate-on voltage Von to all the scan signal lines G1 to Gn, thereby displaying an image for one frame.

When one frame described above ends, the next frame starts, and a state of an inversion signal included in a data control signal CONT2 can be controlled such that the polarity of the data signal applied to each pixel PX should be opposite to the polarity in the previous frame (referred to as "frame inversion").

According to dot inversion, in the next frame, the pixel area positioned in the n-th row has the negative (−) polarity, the pixel area positioned in the (n+1)-th row has the positive (+) polarity, and such polarity arrangements are repeated along the column direction.

Further, in the (n+1)-th row, the pixel area positioned in the n-th row has the positive polarity, the pixel area positioned in the (n+1)-th row has the negative polarity, and such polarity arrangements are repeated along the column direction.

In addition, in each row, such polarity arrangements are repeated in the direction of the gate line.

In the next frame, in the n-th column, the pixel area positioned in the n-th row has the positive polarity, and in this case, the first reference voltage having the positive polarity is applied.

The pixel area positioned in the (n+1)-th row has the negative polarity such that the first reference voltage having the negative polarity is applied according to the gate-on voltage applied to the (n+1)-th row.

Such polarity conversions of the applied voltages are repeated.

Meanwhile, the second reference voltage signal wire applies the second reference voltage Vst2 having the positive polarity with respect to the predetermined voltage.

This is because the pixel area connected to the second reference voltage line has the positive polarity.

Based on the (n+1)-th column, if the pixel area positioned in the n-th row has the positive polarity, the second reference voltage having the positive polarity is applied, and the pixel area positioned in the (n+1)-th row has the negative polarity such that the second reference voltage having the negative polarity is applied according to the gate-on signal applied to the (n+1)-th row.

Such conversions are repeated.

In summary, in another exemplary embodiment of the inventive concept, different reference voltages are applied to the pixel areas according to the polarities of the data voltage, and the reference voltage may have the same polarity as the data voltage.

Particularly, according to another exemplary embodiment of the inventive concept, even if positioned in the same column, the pixel areas may have different polarities, and the reference voltage having the same polarity as the pixels is applied to the corresponding pixels.

The reference voltage variations described above are continuously repeated in each frame.

In summary, in the same frame, the odd-numbered first reference voltage lines may be applied with the predetermined first reference voltage, while the even-numbered reference voltage lines may be applied with the predetermined second reference voltage.

The first and second reference voltages may have opposite polarities with respect to the common voltage.

Such reference voltage variation is periodically repeated in every frame.

Meanwhile, the first and second reference voltages Vst1 and Vst2 may have a voltage between a maximum voltage Vd_max and a minimum voltage Vd_min of the data voltage, and a swing cycle of the first and second reference voltages Vst1 and Vst2 may be one frame.

Figure 10:
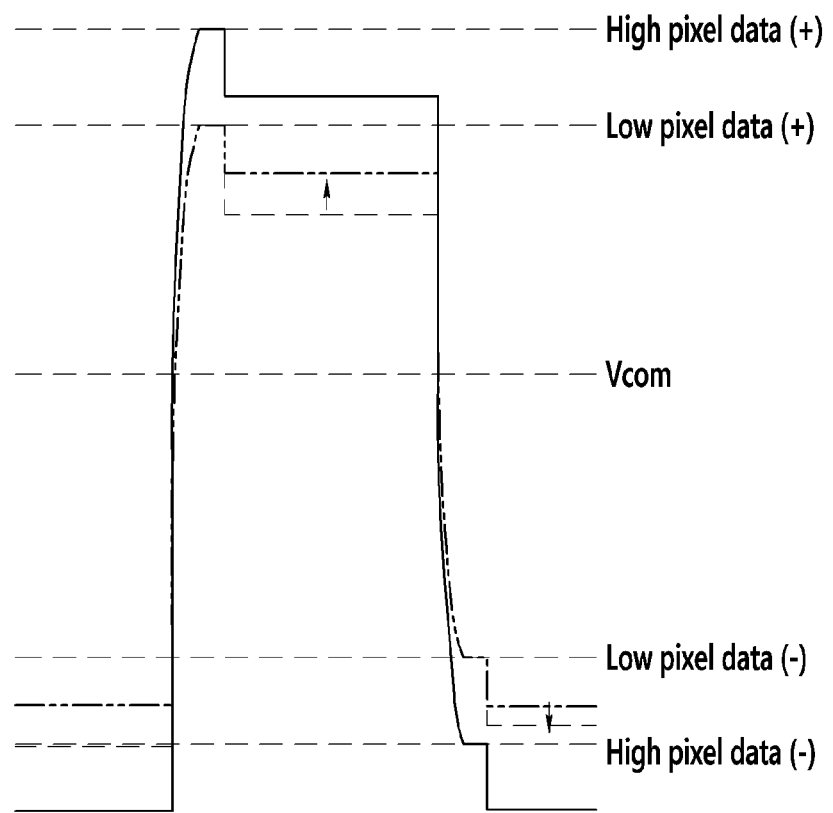
FIG. 10 is a waveform diagram for data voltage according to the exemplary embodiment of the inventive concept.

FIG. 10 is a data voltage waveform diagram according to the exemplary embodiment of the inventive concept.

Referring to FIG. 10, in the frame having the positive polarity with respect to the common voltage, the voltage drop due to a kickback voltage may be compensated by applying the reference voltage having the positive polarity.

Further, in the next frame, when the reference voltage having the negative polarity is applied to the pixel area having the negative polarity with respect to the common voltage, the voltage may be moved such that the voltage difference with respect to the common voltage may be further increased.

That is, regardless of the positive or negative polarity, a low voltage may be moved such that a difference between the high and low voltages is decreased.

Accordingly, even if the polarities are inverted, the display device having uniform luminance can be provided as the voltage gap between the high and low voltages are decreased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a first insulation substrate;
    gate lines disposed on the first insulation substrate to transmit a gate signal;
    data lines crossing and insulated from the gate lines to transmit a data voltage;
    a first switching elements and a second switching elements each connected to a corresponding gate line of the gate lines and a corresponding data line of the data lines;
    a dividing switching elements each connected to a corresponding gate line of the gate lines, a corresponding second switching element of the second switching elements, and a corresponding reference voltage line of reference voltage lines;

pixel electrodes each including a first subpixel electrode and a second subpixel electrode, the first subpixel electrode being connected to a corresponding first switching element of the first switching elements, and the second pixel electrode being connected to a corresponding second switching element of the second switching elements and a corresponding dividing switching element of the dividing switching elements, wherein a reference voltage applied to the dividing switching element from the reference voltage lines varies according to polarities of the data voltage with respect to the common voltage, wherein the first subpixel electrode and the second subpixel electrode respectively comprise a cross-shaped stem portion and a fine branch portion extending from the cross-shaped stem portion, and wherein each of the reference voltage lines includes two vertical portions and a connection portion connecting the two vertical portions and the two vertical portions overlap the cross-shaped stem portions of the first subpixel electrode and the second subpixel electrode, respectively.

2. The display device of claim 1, wherein a plurality of pixel areas disposed at one side of the data lines are connected to the data lines.

3. The display device of claim 1, wherein the data lines are alternately connected to the pixel areas disposed at their left and right sides.

4. The display device of claim 1, wherein the reference voltage lines include a first reference voltage lines and a second reference voltage lines extending in a direction in which the data lines extend, and wherein the first reference voltage lines and the second reference voltage lines are alternately disposed in pixel areas.

5. The display device of claim 4, wherein a first reference voltage provided by the first reference voltage lines and a second reference voltage provided by the second reference voltage lines have different polarities with respect to the common voltage in the same frame.

6. The display device of claim 5, wherein the first and second reference voltages have predetermined magnitudes, and their polarities with respect to the common voltage are inverted in each frame.

7. The display device of claim 6, wherein the first and second reference voltages have a voltage between minimum and maximum voltages of the data voltage.

8. The display device of claim 6, wherein the data voltage and the reference voltage have the same polarity with respect to the common voltage.

9. The display device of claim 5, wherein the first and second reference voltages are respectively inverted in their polarities with respect to the common voltage on each gate-on signal.

10. The display device of claim 1, wherein the data lines are disposed on the same layer as the reference voltage line.

11. The display device of claim 1, further comprising a color filter disposed on the first passivation layer, wherein the color filter is made of a low-dielectric material.

12. The display device of claim 1, wherein the voltage applied to the second subpixel electrode is increased if the data voltage applied to the second subpixel electrode has the same polarity as the reference voltage with respect to the common voltage.

13. A driving method of a display device, the display device including a plurality of pixels, each pixel including a first switching element, a second switching element, a dividing switching element connected between the second switching element and a reference voltage line, the reference voltage line includes two vertical portions and a connection portion connecting the two vertical portions and the two vertical portions overlap cross-shaped stem portions of the first subpixel electrode and the second subpixel electrode, respectively, a first liquid crystal capacitor connected to the first switching element, and a second liquid crystal capacitor, comprising:

applying data voltages to the plurality of pixels;

applying a first reference voltage to pixels applied with the data voltage having a first polarity; and applying a second reference voltage to pixels applied with the data voltage having a second polarity opposite to the first polarity with respect to the common voltage.

14. The driving method of claim 13, wherein the reference voltage line extends in a direction in which the data lines extend to include a first reference voltage line and a second reference voltage line which are alternately connected to the plurality of pixel areas, and the first reference voltage transmitted through the first reference voltage line and the second reference voltage transmitted through the second reference voltage line have opposite polarities with respect to the common voltage in the same frame.

15. The driving method of claim 14, wherein the first and second reference voltages have predetermined magnitudes and their polarities with respect to the common voltage are inverted in each frame.

16. The driving method of claim 15, wherein the first and second reference voltages have a voltage between minimum and maximum voltages of the data voltage.

17. The driving method of claim 14, wherein the first and second reference voltages are inverted in their polarities with respect to the common voltage on each gate-on signal.

18. The driving method of claim 14, wherein the data voltage applied to the second subpixel electrode is increased if the data voltage applied to the second subpixel electrode has the same polarity as the reference voltage with respect to the common voltage.

* * * * *